United States Patent

Stansell et al.

[15] 3,678,480

[45] July 18, 1972

[54] COUPLING FOR A PNEUMATIC ACTUATED MAGNETIC HEAD

[72] Inventors: Alpheus F. Stansell; Eugene E. Bennett, both of Thousand Oaks, Calif.

[73] Assignee: Burroughs Corporation, Detroit, Mich.

[22] Filed: Feb. 2, 1970

[21] Appl. No.: 7,463

[52] U.S. Cl.....................340/174.1 E, 179/100.2 P, 285/158

[51] Int. Cl.......................G11b 5/60, G11b 21/20, F16l 3/04

[58] Field of Search............179/100.2 CA, 100.2 C, 100.2 P; 340/174.1 E, 174.1 F; 92/98 R, 98 D; 285/158

[56] References Cited

UNITED STATES PATENTS

| | | | |
|---|---|---|---|
| 2,847,033 | 8/1958 | Baker | 92/98 |
| 2,612,419 | 9/1952 | Reynolds | 92/98 RD |
| 3,229,268 | 1/1966 | Solyst | 340/174.1 |
| 3,320,599 | 5/1967 | Billawala | 240/174.1 |
| 3,016,248 | 1/1962 | Lindberg | 285/158 |
| 2,841,419 | 7/1958 | Jay | 285/158 |
| 3,470,901 | 10/1969 | Nisley | 285/158 |
| 2,338,686 | 1/1944 | Gredell | 285/158 |
| 3,310,792 | 3/1967 | Groom et al. | 340/174.1 E |

*Primary Examiner*—Vincent P. Canney
*Attorney*—Christie, Parker & Hale

[57] ABSTRACT

A pneumatic actuating device for a magnetic recording head for a disk memory file or the like is described. Pneumatic pressure is brought to the actuator by an air supply tube which is held in place and also sealed by an O-ring surrounding the tube and compressed between a flat surface and a conical surface so as to squeeze inwardly on the outside wall of the tube. Pneumatic pressure within the assembly acts on a diaphragm to which a rigid disk is attached, and the disk acts on one end of a pin, the other end of which actuates the recording head.

6 Claims, 2 Drawing Figures

Figure 1:
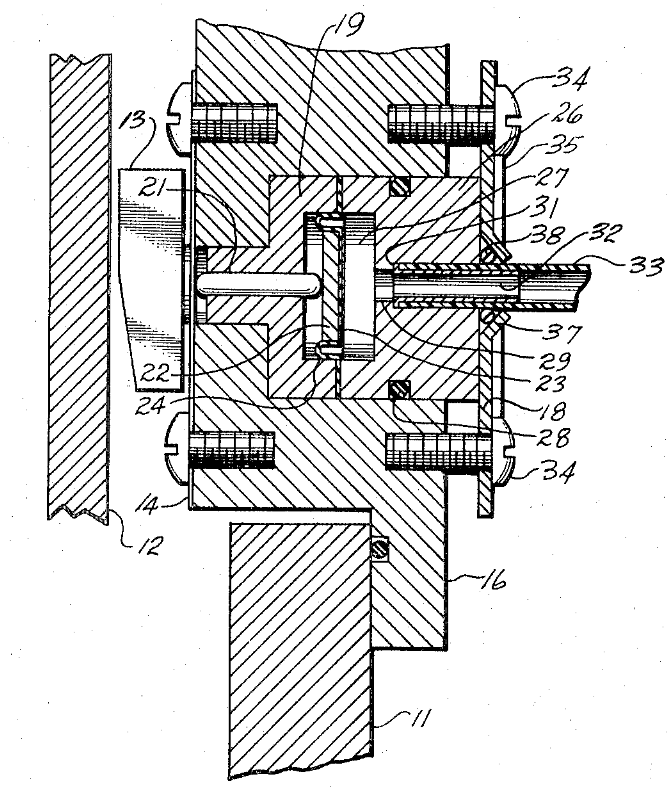

INVENTOR
EUGENE E. BENNETT
ALPHEUS F. STANSELL
BY
Christie, Parker, + Hale
ATTORNEYS

COUPLING FOR A PNEUMATIC ACTUATED MAGNETIC HEAD

BACKGROUND

A significant item of peripheral equipment for digital computers or the like is a magnetic memory system employing a rapidly rotating disk on the surfaces of which is a magnetic recording material for recording magnetic signals. A plurality of magnetic transducers, commonly known as recording heads, are arranged adjacent the faces of the disk for writing and reading magnetic signals thereon. It is common practice to support the recording heads adjacent to the rapidly rotating disk on an air bearing which forms naturally between the rapidly moving disk surface and the stationary recording head. In operating such a system, the magnetic recording head is retracted from the surface of the disk when it is stopped or rotating at low speed and after it has been brought to operating speed, the recording heads are pressed toward the disk surface by pneumatic pressure. Such an operating system employing a magnetic recording disk and a plurality of magnetic transducers is described and illustrated in U.S. Pat. No. 3,229,268, and another is shown in U.S. Pat. No. 3,320,599.

It has been common in such magnetic disk memory systems to employ one pneumatic manifold for a plurality of magnetic recording heads so that only a single air line actuates several heads for moving them toward the disk. If some failure occurred in one of the magnetic recording heads that necessitated deactivation of that head during disk rotation, it was necessary to deactivate an entire bank of recording heads. If the pneumatic actuation system required repair or replacement, the entire disk memory had to be taken to a clean room having a carefully controlled environment for avoiding dust so that the assembly could be removed and repaired or replaced without any likelihood of introducing contamination within the housing surrounding the disk. This meant that field repairs of the pneumatic actuator were not possible without severe risk of contamination.

It is, therefore, desirable to provide a means for actuating a single magnetic recording head and providing for field maintenance without requiring a clean room for disassembly of the pneumatic actuator. Of course, it is always desirable to reduce the cost of manufacturing any item.

BRIEF SUMMARY OF THE INVENTION

Thus, in practice of this invention according to a preferred embodiment, there is provided an improved magnetic head assembly actuating device having a piston for actuating the head and means for applying a pneumatic pressure to the piston for such actuation and wherein this means for actuating includes an air supply tube for each head held in position and sealed by an O-ring compressed between a flat surface normal to the tube and a conical surface coaxial with the tube. In a preferred embodiment the actuator piston comprises a rigid disk in contact with a flexible diaphragm and a pin between the disk and the magnetic head assembly.

DRAWINGS

Figure 2:
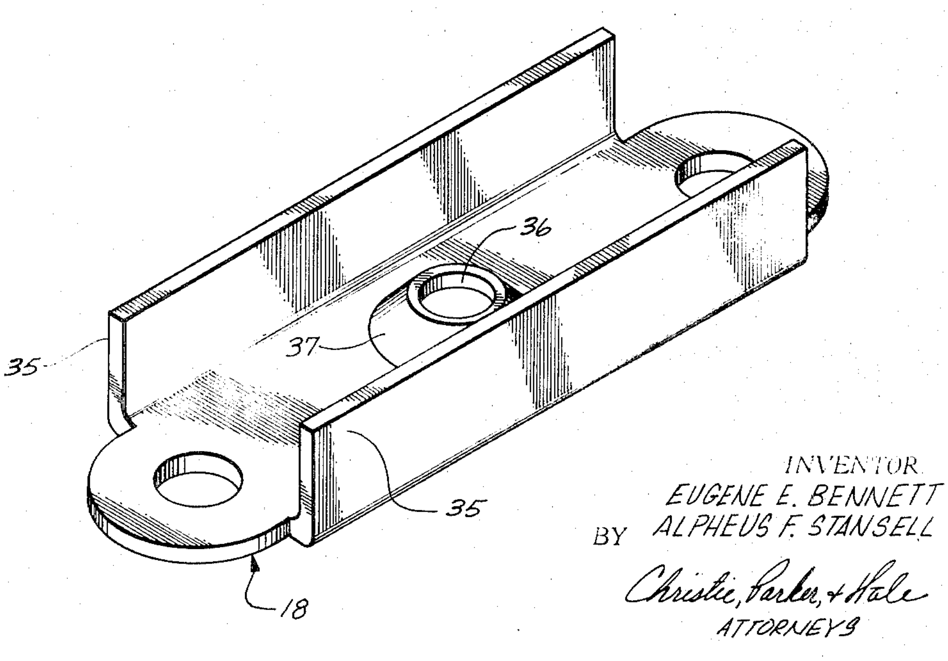

These and other features and advantages of the present invention will be appreciated as the same becomes better understood by reference to the following detailed description of a presently preferred embodiment when considered in connection with the accompanying drawings wherein:

FIG. 1 illustrates in cross-section a pneumatic actuating device constructed according to principles of this invention; and FIG. 2 illustrates in perspective a retainer bracket on the assembly of FIG. 1.

DESCRIPTION

FIG. 1 illustrates in cross-section a pneumatic actuating device for a magnetic recording head assembly constructed according to principles of this invention. As illustrated in this embodiment, there is a disk enclosure 11 within which a rapidly rotating disk 12 can be provided in a conventional manner, such as, for example, as illustrated in the aforementioned U.S. Pat. No. 3,229,268. A conventional magnetic recording head 13 mounted on a conventional spring support 14, such as described and illustrated in U.S. Pat. No. 3,310,792, is provided within the enclosure 11 adjacent the magnetic memory disk 12. All of the aforementioned items are conventional and only their general arrangement and configuration is illustrated in FIG. 1. It should be noted that during operation of such a memory system the interior of the enclosure 11 is pressurized with clean air above the ambient pressure by about one to two inches of water for preventing contamination from entering the system.

A plurality of magnetic recording heads 13 are supported within the enclosure 11 by a head support structure 16, which may be either a circular or rectangular assembly bolted to the enclosure 11 and sealed thereto by an O-ring 17.

With the exception of this head support 16, the disk enclosure 11, and a retainer bracket 18 (FIG. 2), the other parts illustrated in cross-section in FIG. 1 are circularly symmetrical and are adequately shown in the single cross-section. The portions of the actuator assembly illustrated in cross section in FIG. 1 are associated with a single magnetic recording head 13, and there is a similar actuator assembly for each of the recording heads that may be mounted on the head support structure 16.

A stepped hole is provided through the head support structure 16 and fitted within that hole is a piston guide 19 having an axial guide passage within which is a piston pin 21 having rounded ends. One of the ends of the piston pin 21 bears on a portion of the head mounting spring 14 and the opposite end of the pin is in contact with a rigid piston disk 22. The piston disk 22 is adhesively bonded to a flexible rolling diaphragm 23 having a deep circular convolution 24 which permits the diaphragm to deform for a substantial distance without undue stress.

The peripheral edge of the circular diaphragm 23 is clamped between the piston guide 19 and a diaphragm retainer 26. The diaphragm thus forms a seal for a chamber 27 formed by a rebated portion of the diaphragm retainer 26. The diaphragm retainer 26 is also sealed to the head support 16 by an O-ring 28.

The diaphragm retainer 26 is provided with an axial passage 29 in fluid communication with the chamber 27 and including a shoulder 31 against which the end of a headed tubular metal insert 32 is abutted. The insert 32 is within an air supply tube 33 which may, for example, be a thin-walled plastic tube about one-eighth inch outside diameter. The insert 32 is placed within the end of the thin-walled plastic tube 33 to provide additional stiffness at the end, and prevent collapse of the tube when the outside of the tube is sealed. The shoulder 31 limits the depth that the insert 32 and tube 33 can be inserted into the diaphragm retainer 26 upon assembly of the actuator.

The retainer bracket 18 is fastened to the head support 16 by a pair of bolts 34 and bears against the diaphragm retainer 26 for tightly clamping the entire assembly together. As is more clearly seen in FIG. 2, the retainer bracket 18, which is merely stamped from thin sheet metal includes a pair of raised edges or flanges 35 running along the sides parallel to a line between the bolt holes so that the bracket has a U-shaped cross-section for stiffening. Centrally located on the retainer bracket is a hole 36 for passage of the air supply tube 33. Surrounding and coaxial with the hole 36 is a conically flared, or countersunk, portion 37, and when the retainer bracket is assembled on the actuator as illustrated in FIG. 1, a small O-ring 38 is trapped and compressed between the flat face of the diaphragm retainer 26 and the interior of the countersunk portion 37. The pressure of the countersunk portion on the O-ring 38 compresses it inwardly so as to tightly grip the air supply tube for the dual purposes of firmly mechanically supporting the tube to prevent its withdrawal, and also providing a pneumatic seal thereto to prevent air leakage from within the chamber 27. The retainer bracket thus serves a dual function in holding the assembly to the head support structure and also compressing the O-ring to support and seal the tube. The metal insert 32 within the thin-walled flexible plastic tube 33 prevents the tube wall from collapsing under the compressing force of the O-ring 38. When a heavier walled tubing 33 is employed, the insert may not be necessary; however, there is a sacrifice in the flexibility available in the tubing external to the actuator.

It is also convenient to provide a similar support and seal on the opposite end (not shown) of the air supply tube 33 so that the tube can be quickly and reliably mounted and sealed at both ends for providing an air supply to the chamber 27. Such an arrangement is convenient since if it is desired to inactivate one magnetic recording head 13, one need only extract the opposite end of the tube from the air supply and replace the insert 32 with a plug to prevent contamination from entering the air supply tube.

When the actuator is operated, pneumatic pressure entering the chamber 27 from the air supply tube 33, acts on the flexible diaphragm 23 to press the disk 22, and hence piston pin 21, against the spring 14, thereby moving the magnetic recording head 13 towards the disk 12. Previously, a piston in the form of a cylindrical member having a head, has been employed in a pneumatic actuator for a magnetic recording head. This prior construction is just as if the piston pin 21 and disk 22 were rigidly secured together, rather than having a free point contact between the flat surface of the disk and the rounded end of the pin as provided in the preferred embodiment.

The arrangement with a rigid disk held in position by the flexible diaphragm 23, and bearing on an end of the piston pin 21, turns out to be highly advantageous. The pin and disk are readily and very economically made to close tolerances, whereas the previous one-piece piston arrangement required a very careful machining operation to extremely close tolerances. Thus, by making the piston assembly of two pieces instead of one, the manufacturing cost has been cut to approximately one-eighth of the original manufacturing cost. In addition to this very substantial decrease in cost, the two-piece assembly is significantly superior in operation. With a one-piece assembly, an asymmetry in application of force by the diaphragm would cock the piston which would jam and thereby fail to actuate a head. In the illustrated two-piece assembly provided in practice of this invention, the disk 22 acts on a rounded end of the piston pin 21, and even if the disk is substantially cocked due to some asymmetrical force, there is no effect upon operation of the piston pin.

As mentioned hereinabove, a feature of this invention is that the actuator can be serviced without taking the entire magnetic memory disk unit to a clean room, thereby permitting field repair. If it is desired to service or replace an actuator assembly, it is only necessary to remove the mounting bolts 34 whereupon the air supply tube and the diaphragm retainer 26 can be removed either individually or together. This operation is normally performed with the interior of the enclosure 11 slightly pressurized by clean air in order to prevent contamination. The slight pressure of air then urges the piston guide 19 and the remaining parts connected thereto out of the head support 16. This leaves a small hole in the enclosure surrounding the disk; however, this raises no particular problem since the flow of clean air is outwardly from within the pressurized enclosure 11 to the environment, and there is virtually no possibility of bringing contamination within the system through the small hole. It might be noted that the hole into the enclosure when the piston guide 19 is removed is only about 0.4 inch diameter, and the opening is substantially obscured by the spring 14 so that no great volume of air flows from within the enclosure. After repair or when a new actuator is assembled, the assembly is merely pressed into the head support and the mounting bolts 34 reinstalled. If it is desired only to change an air supply tube 33, the bolts 34 need only be loosened in order to relieve the compression of the O-ring 38, and permit withdrawal and reinstallation of an air supply tube.

Although only one embodiment of actuator constructed according to principles of this invention has been described and illustrated herein, many modifications and variations will be apparent to one skilled in the art. Thus, for example, instead of providing a countersunk portion on the retainer bracket 18, a corresponding countersunk portion on the diaphragm retainer 26 and a flat retainer bracket could be used; or partial countersinks could be provided on both members. It turns out that the illustrated arrangement is, for most situations, more economical and is preferred. Having the countersink in the member more remote from the end of the tube is also advantageous since a pull on the tube tends to tighten the O-ring against the tube and further resist withdrawal.

What is claimed is:

1. An improved magnetic head assembly actuating device comprising:
   - a head support sealable to a housing and adapted to support a magnetic head assembly;
   - a piston mounted in the head support having an end in engagement with a magnetic head assembly;
   - a flexible diaphragm adjacent the end of the piston opposite from the magnetic recording head;
   - means for forming a chamber adjacent the diaphragm including an aperture for receiving an air supply tube;
   - an air supply tube in the aperture;
   - a tube retainer having a conical countersink coaxial with the air tube;
   - an O-ring compressed between the conical countersink and the means for forming a chamber for retaining and sealing the exterior of the air tube; and
   - a substantially rigid insert within the end of the air tube in the region surrounded by the O-ring for preventing collapse of the tube.

2. An actuating device as defined in claim 1 wherein the aperture in the means for forming a chamber includes a shoulder for engaging an end of the tube and preventing overinsertion thereof.

3. An improved magnetic head assembly actuating device comprising:
   - a head support sealable to a housing and adapted to support a magnetic head assembly;
   - an axially slidable pin having a first rounded end in engagement with a magnetic head assembly;
   - a rigid flat disk having a face engaging a rounded end of the pin opposite from the end engaging the magnetic head assembly;
   - a flexible diaphragm connected to the face of the disk opposite from the magnetic recording head assembly;
   - means for forming a chamber adjacent the diaphragm including an aperture for receiving an air supply tube;
   - an air supply tube in the aperture;
   - a tube retainer having a conical countersink coaxial with the air tube; and
   - an O-ring compressed between the conical countersink and a flat surface on the means for forming a chamber for retaining and sealing the exterior of the air tube.

4. An improved magnetic head assembly actuating device comprising:
   - a head support sealable to a housing and adapted to support a magnetic head assembly;
   - a piston pin having rounded ends, one of the ends being in engagement with the magnetic head assembly;
   - means for guiding the pin for axial motion;
   - a rigid flat disk having one face in engagement with the other rounded end of the pin;
   - a flexible rolling diaphragm in engagement with the opposite face of the disk and isolating the disk from engagement with the walls of the head support; and
   - means for applying pneumatic pressure to the other side of the diaphragm.

5. In a magnetic head assembly actuating device comprising a head support, a flexible rolling diaphragm mounted in the head support, and means for applying pneumatic pressure to the diaphragm; an improved piston comprising:

a cylindrical pin having rounded ends with one end engaging a magnetic head assembly;

means for guiding the pin for axial motion; and a substantially rigid flat disk having one face engaging the other rounded end of the pin and the opposite face engaging the diaphragm, the edges of the disk being isolated from the walls of the head support.

6. In an improved magnetic head assembly actuating device as defined in claim 5, an improved means for applying pneumatic pressure to the diaphragm comprising chamber means for applying uniform pneumatic pressure to the diaphragm;

an air supply tube in fluid communication with the chamber means;

a retainer bracket having an aperture for accommodating the end of the air tube;

a conical countersink in the retainer bracket;

a flat face opposite the conical countersink for forming a conical recess circumscribing the air tube; and an O-ring in the conical recess for compression by the countersink against the outside of the air tube for retaining and sealing the tube.

* * * * *